US012654494B2

(12) United States Patent
Matsubara

(10) Patent No.: US 12,654,494 B2
(45) Date of Patent: Jun. 16, 2026

(54) PNEUMATIC TIRE

(71) Applicant: Toyo Tire Corporation, Hyogo (JP)

(72) Inventor: Keisuke Matsubara, Hyogo (JP)

(73) Assignee: Toyo Tire Corporation, Hyogo (JP)

( * ) Notice: Subject to any disclaimer, the term of this patent is extended or adjusted under 35 U.S.C. 154(b) by 6 days.

(21) Appl. No.: 18/815,191

(22) Filed: Aug. 26, 2024

(65) Prior Publication Data

US 2025/0074118 A1     Mar. 6, 2025

(30) Foreign Application Priority Data

Sep. 1, 2023     (JP) ................................. 2023-142098

(51) Int. Cl.
B60C 13/02     (2006.01)
B60C 11/03     (2006.01)
(52) U.S. Cl.
CPC ...... B60C 11/0327 (2013.01); B60C 11/0306 (2013.01); B60C 13/02 (2013.01)
(58) Field of Classification Search
CPC ..... B60C 13/02; B60C 13/001; B60C 13/002; B60C 13/023
See application file for complete search history.

(56) References Cited

FOREIGN PATENT DOCUMENTS

| JP | H0485105 | A | * | 3/1992 | ............ B60C 11/01 |
|---|---|---|---|---|---|
| JP | H06305306 | A | * | 11/1994 | ............ B60C 11/01 |
| JP | 2006256433 | A | * | 9/2006 | ............ B60C 11/01 |
| JP | 2012176703 | A | | 9/2012 | |
| JP | 2021054191 | A | * | 4/2021 | ............ B60C 11/01 |

* cited by examiner

*Primary Examiner* — Justin R Fischer
*Assistant Examiner* — Philip N Schwartz
(74) *Attorney, Agent, or Firm* — MUNCY, GEISSLER, OLDS & LOWE, P.C.

(57)          ABSTRACT

In a pneumatic tire, a buttress has formed therein a straight region with a flat surface, and a projection which is located adjacent to the straight region in a radially inward direction of the tire and which is formed in an annular shape along a tire circumferential direction. The length (d1+d2) in a tire radial direction from an edge of the straight region in a radially outward direction of the tire to a tip of the projection is greater than the length in the tire radial direction from a ground contact edge of the tread to the edge of the straight region in the radially outward direction of the tire. The height of the projection is greater than or equal to 0.5 mm and less than or equal to 1.0 mm.

11 Claims, 5 Drawing Sheets

PNEUMATIC TIRE

CROSS REFERENCE TO RELATED APPLICATION

This application claims priority to Japanese Patent Application No. 2023-142098 filed on Sep. 1, 2023, which is incorporated herein by reference in its entirety including the specification, claims, drawings, and abstract.

TECHNICAL FIELD

The present disclosure relates to a pneumatic tire.

BACKGROUND

Conventionally, at a buttress of a tire, a projection is typically formed resulting from a seam in a mold, and a side protector is formed for providing a design feature. Further, in a tire for a light truck or a sports utility vehicle (SUV), a side protector is formed for improving side traction performance and side cut performance. Furthermore, there is also known a tire in which a plurality of projections are formed at the buttress in order to produce air turbulence at the tire side face and thereby suppress temperature increase in the tread (see JP 2012-176703 A).

In recent years, there has been a strong demand for a reduction in vehicle fuel consumption, and regarding tires, there is a demand for a reduction in air resistance. Conventionally, regarding the shape of the buttress, emphasis has been placed on design, producibility, and the like, and hardly any study has been conducted from the perspective of aerodynamic performance. However, as a result of studies by the present inventors, it was found that the shape of the buttress greatly affects the aerodynamic performance of a tire.

SUMMARY

A pneumatic tire according to an aspect of the present disclosure is a pneumatic tire having a tread and a buttress. In the buttress, there are formed a straight region with a flat surface, and a projection which is located adjacent to the straight region in a radially inward direction of the tire and which is formed in an annular shape along a tire circumferential direction. A length $(d1+d2)$ in a tire radial direction from an edge of the straight region in a radially outward direction of the tire to a tip of the projection is greater than a length $(d3)$ in the tire radial direction from a ground contact edge of the tread to the edge of the straight region in the radially outward direction of the tire. A height of the projection is greater than or equal to 0.5 mm and less than or equal to 1.0 mm.

According to the pneumatic tire according to the present disclosure, air resistance can be effectively reduced. For example, the pneumatic tire according to the present disclosure contributes to a reduction in vehicle fuel consumption.

BRIEF DESCRIPTION OF DRAWINGS

Embodiment(s) of the present disclosure will be described based on the following figures, wherein.

DESCRIPTION OF EMBODIMENTS

An example embodiment of a pneumatic tire according to the present disclosure will be described below in detail by reference to the drawings. The embodiment described below is simply one example, and the present disclosure is not limited to the embodiment below. Further, configurations formed by selectively combining the constituent elements of the embodiment described below are included within the scope of the present disclosure.

Figure 1:
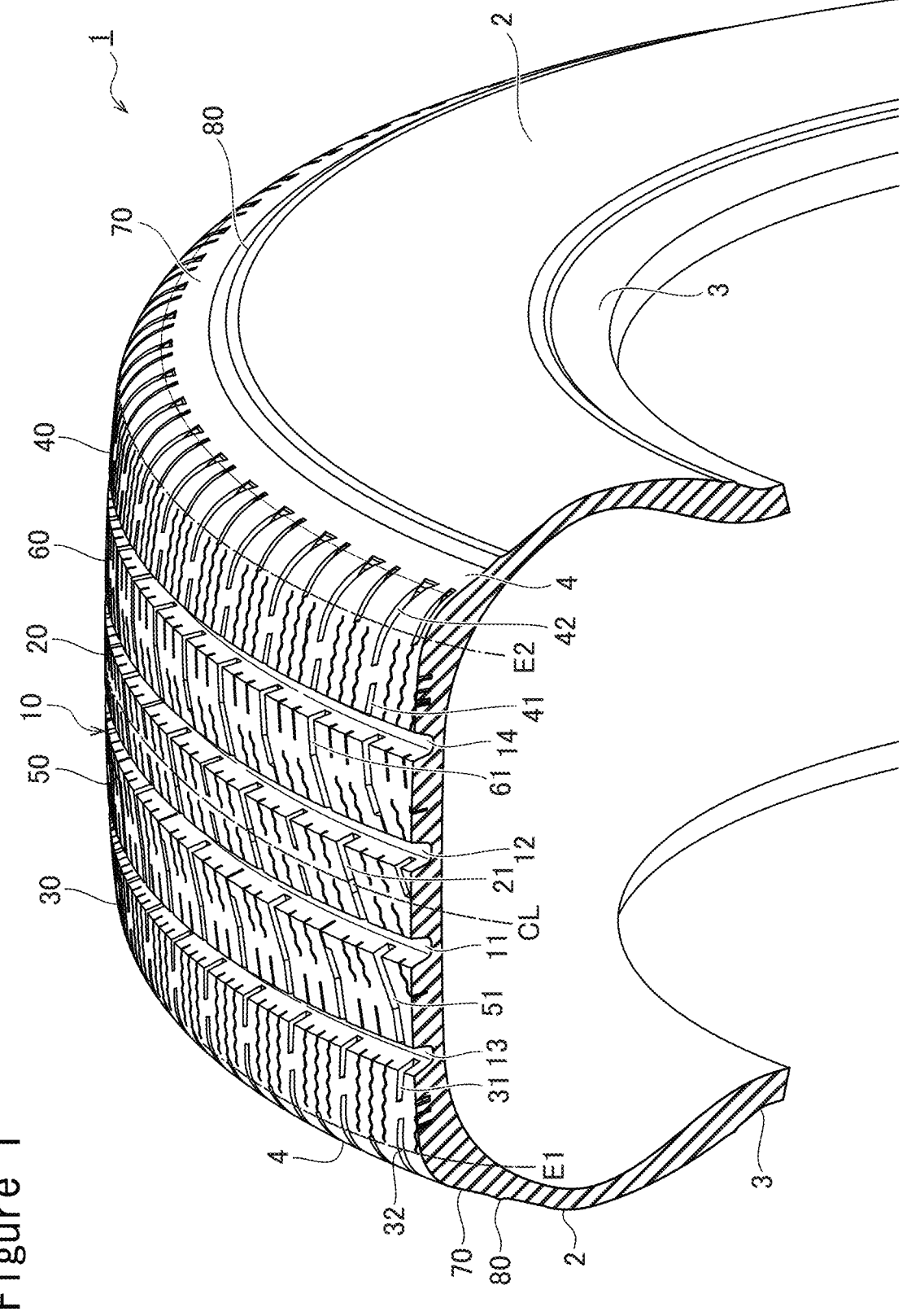
FIG. 1 is a perspective view of a pneumatic tire according to an example embodiment.

FIG. 1 is a perspective view of a pneumatic tire 1 according to an example embodiment. As shown in FIG. 1, the pneumatic tire 1 comprises a tread 10 which is a part that comes in contact with the road surface, a pair of sidewalls 2 that are convex in the axially outward direction of the tire, a pair of beads 3 which are parts to be fixed to a rim of a wheel, and a pair of buttresses 4. The buttresses 4 are parts located between the tread 10 and the respective sidewalls 2, and are also referred to as shoulders. The sidewalls 2, the beads 3, and the buttresses 4 extend in the radially inward direction of the tire from the left and right edges of the tread 10, and form the side faces of the tire.

In the present specification, the buttresses 4 are defined as regions extending from ground contact edges E1, E2 of the pneumatic tire 1 to edges, in the radially inward direction of the tire, of projections 80 formed in the shape of a rib. In other words, the ground contact edges E1, E2 define the location of the boundaries between the tread 10 and the buttresses 4, and the edges of the projections 80 in the radially inward direction of the tire define the location of the boundaries between the sidewalls 2 and the buttresses 4.

The pneumatic tire 1 is a point-symmetric tire, which has no designated mounting direction with respect to a vehicle, and in which, when mounted to a vehicle in either direction, the tread pattern and the shape of the tire side faces are the same. The tread pattern and the shape of the tire side faces of the pneumatic tire 1 are configured such that the shapes on the left and right sides of the tire equator CL are mutually rotated by 180°. The equator CL is a virtual line passing through the center in the tire axial direction of the tread 10 and extending along the tire circumferential direction.

The tread 10 comprises a plurality of main grooves extending in the tire circumferential direction, and a plurality of blocks separated by the main grooves. In the present embodiment, there are formed four circumferential grooves, namely, a first main groove 11, a second main groove 12, a third main groove 13, and a fourth main groove 14, and these main grooves extend parallel to each other in the tire circumferential direction. The four main grooves may have widths that are identical to each other, but in the present embodiment, the main grooves 11, 12 formed at positions toward the equator CL are formed slightly wider than the main grooves 13, 14 formed at positions toward the ground contact edges E1, E2. Further, the four main grooves extend straight in the tire circumferential direction with uniform widths. With these features, it is possible to provide an increased area of grooves that are continuous in the tire circumferential direction, and good drainage performance can be obtained in the entire area of the tread 10.

The blocks include a center block 20, a first shoulder block 30, and a second shoulder block 40. The blocks additionally include a first mediate block 50 provided between the center block 20 and the shoulder block 30, and a second mediate block 60 provided between the center block 20 and the shoulder block 40. Blocks are raised portions projecting in the axially outward direction of the tire, and may be referred to as land area in the field of the tire industry.

In the tread 10, there are formed a plurality of lateral grooves which extend in directions intersecting the main grooves and which are connected to the main grooves. The lateral grooves may extend straight in the tire axial direction, but are preferably slanted at a predetermined angle relative to the tire axial direction. In the present embodiment, as the lateral grooves, there are formed slits 21 dividing the center block 20, and slits 22, 23 terminating within the center block 20 (see FIG. 2 described later). Additionally, sipes having the form of thin lines are formed in the center block 20.

In the present specification, a slit is defined as a lateral groove with a width of greater than or equal to 1.5 mm, and a sipe is defined as a lateral groove with a width of less than or equal to 1.5 mm. The width of a slit is preferably greater than or equal to 2.0 mm and less than or equal to 4.0 mm. The width of a sipe is preferably greater than or equal to 0.3 mm and less than or equal to 1.0 mm.

The tread 10 further comprises slits 31, 32 and sipes formed in the shoulder block 30, and slits 41, 42 and sipes formed in the shoulder block 40. Furthermore, in the tread 10, there are formed slits 51 dividing the mediate block 50, and slits 61 dividing the mediate block 60. In the mediate blocks 50, 60, a plurality of slits and sipes terminating within these blocks are formed in a manner similar to in the center block 20.

Each of the center block 20 and the mediate blocks 50, 60 is composed of a plurality of blocks separated by the corresponding slits 21, 51, 61 and aligned in one row in the tire circumferential direction. In contrast, the shoulder blocks 30, 40 are formed continuously in the tire circumferential direction in the shape of a rib. In the field of the tire industry, a land area that is continuous along the entire circumference of a tire may be customarily referred to as a rib, and it can be said that the shoulder blocks 30, 40 are ribs.

As will be described in detail further below, each buttress 4 of the pneumatic tire 1 has formed therein a straight region 70 with a flat surface, and a projection 80 which is located adjacent to the straight region 70 in a radially inward direction of the tire and which is formed in an annular shape along the tire circumferential direction. Further, the length (d1+d2) in the tire radial direction from the edge of the straight region 70 in the radially outward direction of the tire to the tip of the projection 80 is greater than the length in the tire radial direction from the ground contact edge E1, E2 of the tread to the edge of the straight region 70 in the radially outward direction of the tire. Furthermore, the height of the projection 80 is less than or equal to 1.0 mm. With these features, air resistance can be effectively reduced, and a tire contributing to reduction in vehicle fuel consumption can be provided.

In the present specification, ground contact edges E1, E2 are defined as two edges, in the tire axial direction, of an area (i.e., a ground contact surface) that comes in contact with a flat road surface when an unused pneumatic tire 1 is mounted on a normal rim, filled with air to the normal internal pressure, and subjected to a predetermined load while in that state. In the case of a passenger car tire, the predetermined load is a load corresponding to 88% of the normal load.

Here, a "normal rim" is a rim designated by tire standards, and is a "standard rim" according to JATMA and a "measuring rim" according to TRA and ETRTO. The "normal internal pressure" is the "maximum air pressure" according to JATMA, the maximum value shown in the table "TIRE LOAD LIMITS AT VARIOUS COLD INFLATION PRESSURES" according to TRA, and the "inflation pressure" according to ETRTO. The normal internal pressure is typically 180 kPa for a passenger car tire, but in cases where the tire is labeled "Extra Load" or "Reinforced", the normal internal pressure is 220 kPa. The "normal load" is the "maximum load performance" according to JATMA, the maximum value shown in the table "TIRE LOAD LIMITS AT VARIOUS COLD INFLATION PRESSURES" according to TRA, and the "load capacity" according to ETRTO.

The pneumatic tire 1 comprises, for example, a carcass, a belt, and a cap ply. The carcass is a cord layer covered with rubber, and serves as the skeleton of the tire configured to withstand load, shock, air pressure, and the like. The carcass is composed of two carcass plies, and has a radial structure in which carcass cords are arranged in a direction orthogonal to the tire circumferential direction. On the inner side of the carcass, an inner liner is generally provided, which is a rubber layer for maintaining air pressure. The belt is a reinforcement band arranged between the rubber constituting the tread 10 and the carcass.

On the sidewalls 2, there are generally indicated characters, numbers, symbols, and the like, which are referred to as a serial code. The serial code includes, for example, information such as size code, time of production (the week and year of production), place of production (factory code), and the like.

Figure 2:
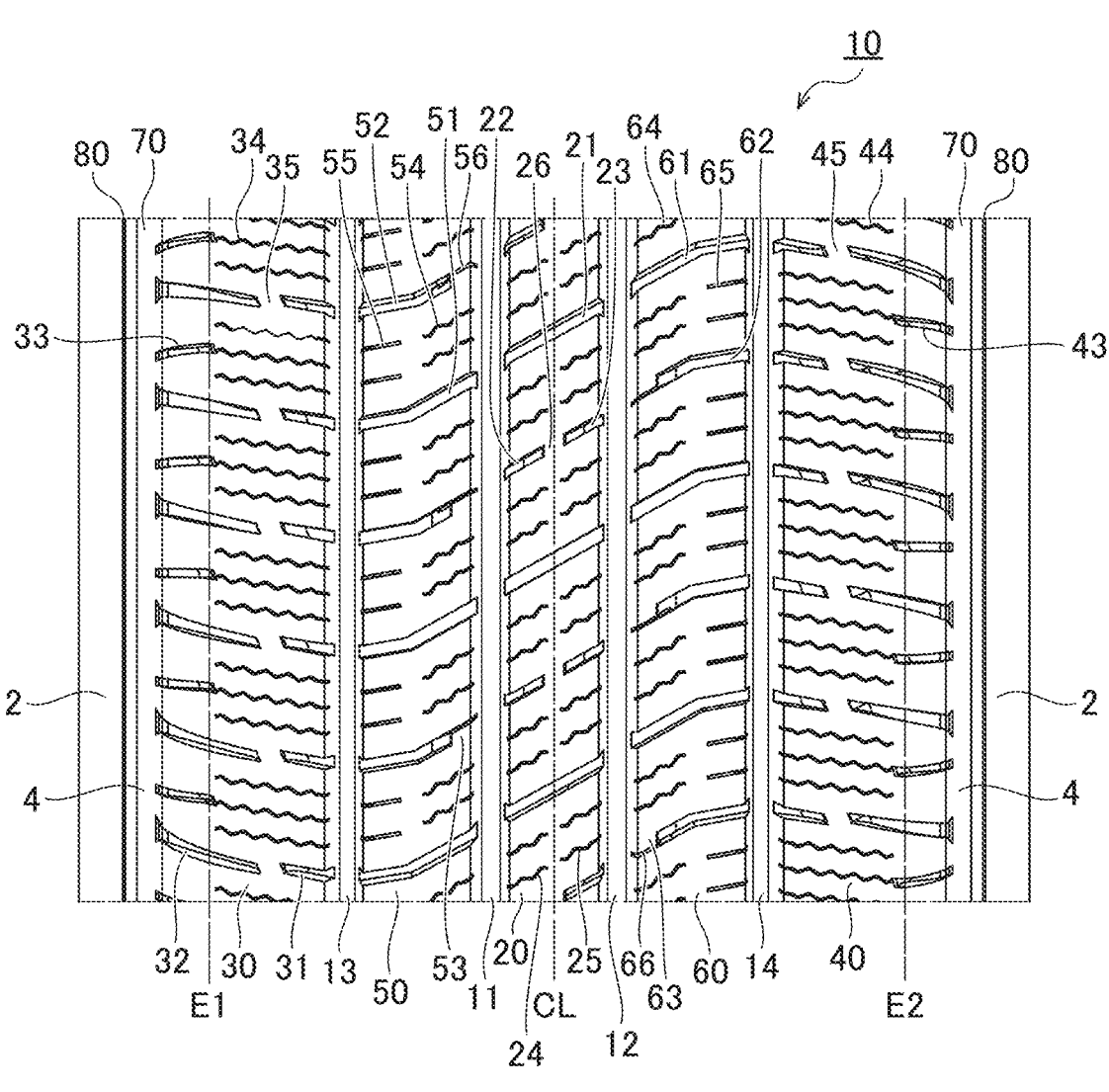
FIG. 2 is a plan view of the pneumatic tire according to the example embodiment, and shows a part of a tread in enlargement.

Next, the tread pattern will be described in detail by reference to FIG. 2. FIG. 2 is a plan view of the pneumatic tire 1, and shows a part of the tread 10 in enlargement.

As shown in FIG. 2, the tread 10 comprises the center block 20 located on the equator CL. As described above, the tread 10 further comprises the shoulder blocks 30, 40 and the mediate blocks 50, 60. The main groove 11 is formed between the center block 20 and the mediate block 50, while the main groove 12 is formed between the center block 20 and the mediate block 60, and these main grooves separate the center block 20 from the mediate blocks 50, 60. Further, the main groove 13 is formed between the mediate block 50 and the shoulder block 30 so as to separate these two blocks from each other, and the main groove 14 is formed between the mediate block 60 and the shoulder block 40 so as to separate these two blocks from each other.

The main grooves may be formed with depths that are identical to each other, but in the present embodiment, the main grooves 11, 12 are formed slightly deeper than the main grooves 13, 14. The main grooves 11, 12 have substantially the same widths and depths, and the main grooves 13, 14 have substantially the same widths and depths. The depths of the main grooves are substantially uniform over the entire length except at a part where a wear indicator is formed. In the present specification, a width of a main groove means a groove width along the profile plane of the tread 10, or in other words, a groove width at the opening of the groove, and a depth of a main groove means a length from the profile plane to the deepest part of the groove bottom (the same applies to a lateral groove). The profile plane of the tread 10 is a plane along the surface of the tread 10.

Walls of each main groove are slanted such that the groove volume decreases toward the groove bottom. Since the walls of the main grooves constitute sidewalls of the blocks, another way of expressing this feature is that, in each block, the sidewalls are slanted such that the block width increases in a direction away from the ground contact surface. In contrast, walls of each lateral groove are formed at an angle perpendicular or nearly perpendicular to the profile plane of the tread 10. Further, the lateral grooves are formed to have smaller widths and smaller depths than the main grooves. The depths of the slits and the sipes may be identical, but in the present embodiment, the slits are formed to have greater depths than the sipes.

As described above, the pneumatic tire 1 has a plurality of sipes formed in the respective blocks. The pneumatic tire 1 exhibits good gripping force even on snowy and icy road surfaces, and is, for example, suitable as an all-season tire. The total width of the pneumatic tire 1 is not particularly limited, and is, in one example, greater than or equal to 205 mm and less than or equal to 275 mm. The aspect ratio of the pneumatic tire 1 is likewise not particularly limited, but when the aspect ratio is greater than or equal to 60%, reduction in air resistance resulting from the use of the configuration of the buttress 4 becomes more notable. An example of a suitable range for the aspect ratio of the pneumatic tire 1 is greater than or equal to 60% and less than or equal to 80%, or greater than or equal to 65% and less than or equal to 75%.

A slit 21 traversing the center block 20, slits 51 and 61 respectively traversing the mediate blocks 50 and 60, and slits 31, 32, 41, 42 in the shoulder blocks 30, 40 are formed to be located on a single S-curved line. Similarly, slits 32, 33 terminating within the center block 20 and slits 52, 62 respectively terminating within the mediate blocks 50 and 60 are formed to be located on a single S-curved line together with slits in the shoulder blocks 30, 40. Each of these sets of slits is provided in a plural number along the tire circumferential direction at predetermined intervals. The predetermined intervals are preferably of a variable pitch pattern in which the intervals are varied along the tire circumferential direction after every predetermined number of sets of slits.

The center block 20 and the mediate blocks 50, 60 may have widths that are identical to each other, but in the present embodiment, the widths of the mediate blocks 50, 60 are greater than the width of the center block 20. Further, the ground contact area of each of the mediate blocks 50, 60 is larger than the ground contact area of the center block 20, and is, for example, between more than or equal to 1.1 times and less than or equal to 1.3 times the ground contact area of the center block 20. The ground contact areas of the mediate blocks 50, 60 are substantially the same. Furthermore, the ground contact areas of the shoulder blocks 30, 40 are substantially the same, and are larger than the ground contact areas of the mediate blocks 50, 60.

The configurations of the center block 20, the shoulder blocks 30, 40, and the mediate blocks 50, 60 will next be described in further detail.

Center Block

The center block 20 extends from the main groove 11 to the main groove 12, and is divided up in the tire circumferential direction by the slits 21 which connect the main grooves 11, 12 to each other. On the equator CL of the tread 10, a plurality of center blocks 20 divided by the slits 21 are aligned in one row. The intervals of the slits 21 in the tire circumferential direction, the lengths of the center blocks 20 in the tire circumferential direction, and the intervals, in the tire circumferential direction, of the lateral grooves formed in the respective blocks are varied in a variable pitch pattern.

Each slit 21 is formed in a straight shape from the main groove 11 to the main groove 12, and is slanted at a predetermined angle relative to the tire axial direction. The predetermined angle is, for example, greater than or equal to 15° and less than or equal to 40°. At each position substantially equidistant from two slits 21 adjacent to each other in the tire circumferential direction, slits 22, 23 terminating within the center block 20 are formed. The slit 22 is connected to the main groove 11, while the slit 23 is connected to the main groove 12, and the slits 22, 23 are located on a single straight line at positions opposite to each other across a bridge 26. The slits 22, 23 are formed substantially parallel to the slits 21. Further, the slits 22, 23 have dimensions (i.e., widths, lengths, and depths) that are substantially identical to each other, and are formed to have a slightly smaller width compared to the slits 21.

Each of the center blocks 20 is formed in a shape in which two sub-blocks arranged alongside each other in the tire circumferential direction are joined by a bridge 26, which is a part located between the slits 22 and 23. By having the two sub-blocks joined by the bridge 26 without being separated, it is possible, for example, to increase stiffness of the center block 20 and enhance the braking characteristic while improving the edge effect, drainage performance, and the like. Further, in each area between a slit 21 and slits 22, 23, a plurality of sipes 24, 25 terminating within the block are formed. By means of the edge effect provided by the sipes 24, 25, snow performance is improved.

Each sipe 24 is connected to the main groove 11, while each sipe 25 is connected to the main groove 12, and a pair of sipes 24, 25 are formed so as to be positioned on a single straight line without being connected to each other. The sipes 24, 25 may be formed in a straight shape, but in the present embodiment, each sipe has a plurality of bends and is formed in a zigzag shape. Two each of sipes 24 and 25 are provided in each area between a slit 21 and slits 22, 23, so that a total of eight sipes are present in one center block 20. The lengths of the sipes 24, 25 are substantially the same, and the direction of extension of the sipes 24, 25 is substantially parallel to the direction of extension of the slits 21, 22, 23.

Shoulder Blocks

In the shoulder block 30, slits 31, 32, 33 terminating within the block are formed. Meanwhile, the tread 10 has no slit that divides up the shoulder block 30. Each slit 31 has a length extending from the main groove 13 and not reaching the ground contact edge E1, and each slit 32 has a length extending from a position spaced from the main groove 13 and reaching beyond the ground contact edge E1. That is, the slit 32 is formed extending over the buttress 4. A pair of slits 31, 32 are arranged on a single straight line at positions opposite to each other across a bridge 35. Intervals of the slits 31, 32 in the tire circumferential direction are varied in a variable pitch pattern.

The shoulder block 30 is formed in a shape of a rib that extends continuously in the tire circumferential direction by being connected by bridges 35, which are parts located between the slits 31 and 32. By configuring such that the ground contact surface of the shoulder block 30 is continuous in the tire circumferential direction, it is possible, for example, to increase stiffness of the shoulder block 30 and enhance the CP characteristic while improving the edge effect, drainage performance, and the like. Further, between two slits 32 that are adjacent to each other in the tire circumferential direction, a slit 33 is formed from a position slightly toward the main groove 13 from the ground contact edge E1 and extending over the buttress 4.

In the shoulder block 30, there are formed a plurality of sipes 34 connected to the main groove 13. The direction of extension of the sipes 34 is substantially parallel to the direction of extension of the slits 31, 32. In each area between slits 31, 32 adjacent to each other in the tire circumferential direction, three sipes 34 are formed, each having a zigzag shape and a length not reaching the ground contact edge E1. By means of the edge effect provided by the sipes 34, snow performance is improved.

As noted above, the pneumatic tire 1 is a point-symmetric tire, and the plan-view shape of the shoulder block 40 is identical to the plan-view shape of the shoulder block 30 obtained when the tread 10 is rotated by 180° about an axis extending through the tire rotational axis and the equator CL. In the shoulder block 40, slits 41, 42, 43 and sipes 44 are formed as lateral grooves. Further, the shoulder block 40 is formed in a shape of a rib that extends continuously in the tire circumferential direction by being connected by bridges 45.

Mediate Blocks

The mediate block 50 extends from the main groove 11 to the main groove 13, and is divided up in the tire circumferential direction by the slits 51 which connect the main grooves 11, 13 to each other. In the area between the two main grooves 11, 13 of the tread 10, a plurality of mediate blocks 50 divided by the slits 51 are aligned in one row in the tire circumferential direction. The intervals of the slits 51 in the tire circumferential direction, the lengths of the mediate blocks 50 in the tire circumferential direction, and the intervals, in the tire circumferential direction, of the lateral grooves formed in the respective blocks are varied in a variable pitch pattern.

Each slit 51 is configured such that its segment of a predetermined length extending from the main groove 11 is located on a line obtained by extending a slit 21 in the center block 20. Then, at a midway point, the slit 51 bends in such a manner that its angle of inclination relative to the tire axial direction becomes reduced, and extends to the main groove 13. At each position substantially equidistant from two slits 51 adjacent to each other in the tire circumferential direction, a slit 52 terminating within the mediate block 50 is formed. The slit 52 is connected to the main groove 13, and is formed substantially parallel to the slits 51. The slit 52 has a bend at a position aligned in the tire circumferential direction with the bends in the slits 51. Further, the slit 52 is connected to the main groove 11 via a sipe 56.

The mediate block 50 is formed in a shape in which two sub-blocks arranged alongside each other in the tire circumferential direction are joined by a bridge 53, which is a part located between the slit 51 and the main groove 11. By having the two sub-blocks joined by the bridge 53 without being separated by a slit, it is possible, for example, to increase stiffness of the mediate block 50 while improving the edge effect, drainage performance, and the like. Further, in each area between two slits 51 and 52, a plurality of sipes 54, 55 terminating within the block are formed.

Each sipe 54 is connected to the main groove 11 and formed in a zigzag shape, while each sipe 55 is connected to the main groove 13 and formed in a straight-line shape. The direction of extension of the sipes 54, 55 is substantially parallel to the direction of extension of the slits 51, 52. Two each of sipes 54 and 55 are provided in each area between adjacent slits 51 and 52, so that a total of eight sipes are present in one mediate block 50. The sipes 54 are formed to have a length greater than that of the sipes 55 but without being connected to the sipes 55.

Since the pneumatic tire 1 is a point-symmetric tire, the plan-view shape of the mediate block 60 is identical to the plan-view shape of the mediate block 50 obtained when the tread 10 is rotated 180° about an axis extending through the tire rotational axis and the equator CL. In the mediate block 60, slits 61, 62 and sipes 64, 65, 66 are formed as lateral grooves. Further, the mediate block 60 is formed in a shape in which two sub-blocks arranged alongside each other in the tire circumferential direction are joined by a bridge 63.

Figure 3:
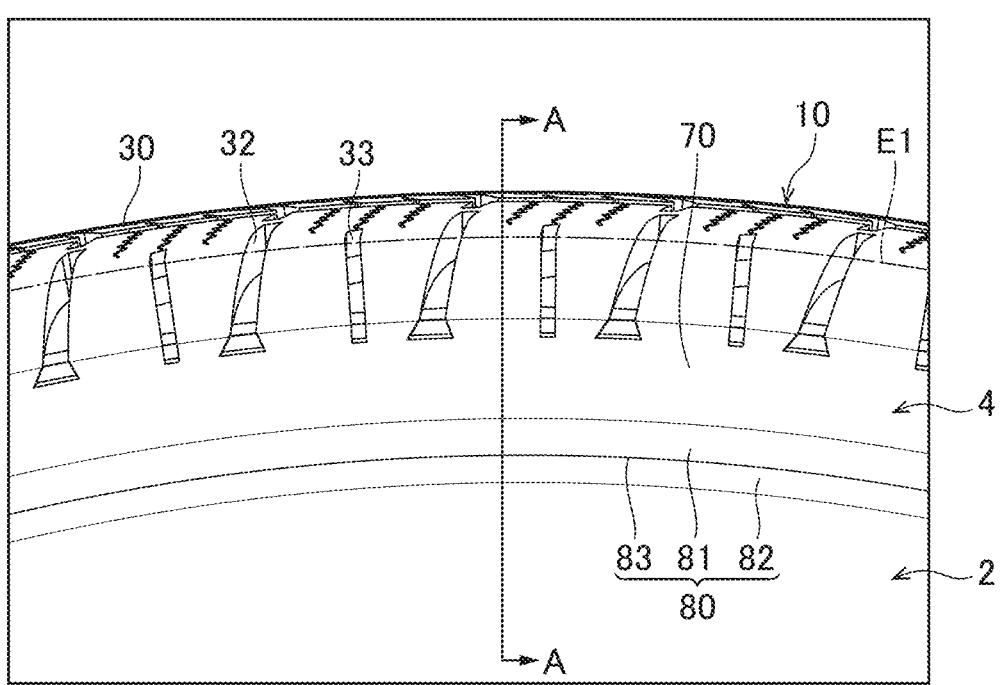
FIG. 3 is a side view of the pneumatic tire according to the example embodiment, and shows a part of a buttress in enlargement.

Next, the buttresses 4 will be described in detail by reference to FIGS. 3 to 5. FIG. 3 is a side view of the pneumatic tire 1, and shows a part of a buttress 4 in enlargement.

Figure 4:
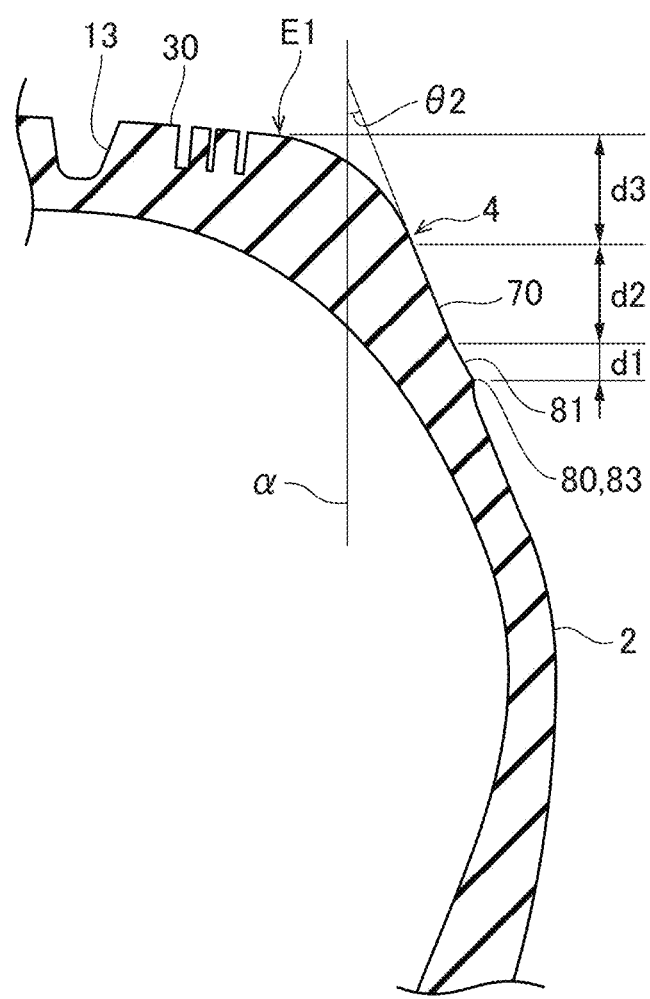
FIG. 4 is a cross-sectional view taken along line A-A in FIG. 3.
Figure 5:
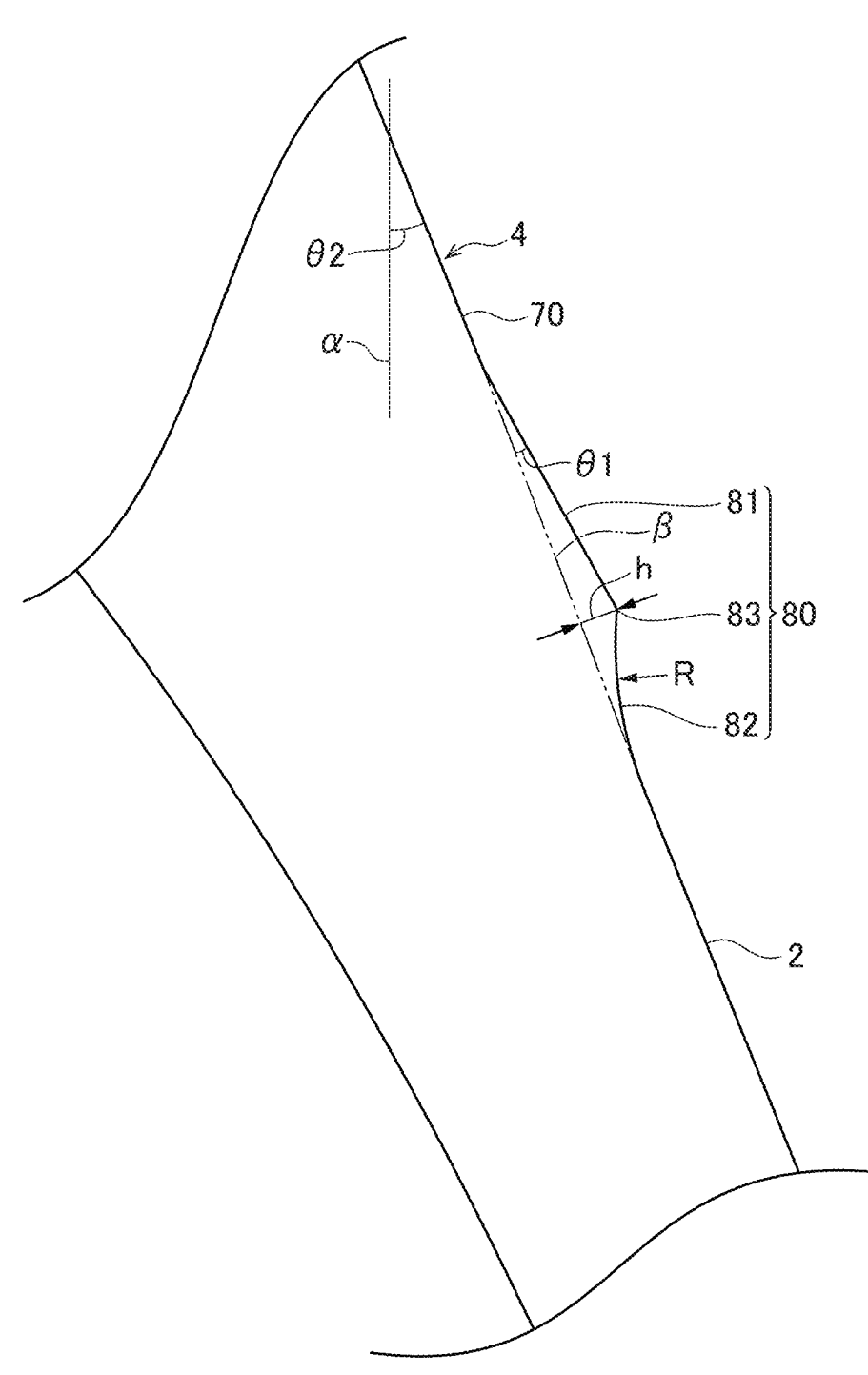
FIG. 5 shows a projection and a straight region in FIG. 4 in enlargement.

FIG. 4 is a cross-sectional view taken along line A-A in FIG. 3, and FIG. 5 shows the projection 80 and the straight region 70 in FIG. 4 in enlargement.

As shown in FIGS. 3 to 5, in the buttress 4, there are formed a straight region 70 with a flat surface, and a projection 80 which is located adjacent to the straight region 70 in a radially inward direction of the tire and which is formed in an annular shape along the tire circumferential direction. As noted above, the buttress 4 is a region extending from the ground contact edge E1, E2 to an edge of the projection 80 in the radially inward direction of the tire. In an area extending from the ground contact edge E1, E2 to the straight region 70, the surface of the buttress 4 is curved so as to be convex in the outward direction of the tire. The radius of curvature of the curved surface between the ground contact edge E1, E2 and the straight region 70 is, for example, greater than or equal to 20 mm and less than or equal to 30 mm.

While FIGS. 3 to 5 show the tire side face on the side of the ground contact edge E1, the tire side face on the side of the ground contact edge E2 has the same configuration. The lengths, in the tire radial direction, from the rotational axis of the tire to the ground contact edge E1, E2, the straight region 70, and the projection 80 are identical between the left and right sides of the pneumatic tire 1.

The buttress 4 can be referred to as a side face part of the shoulder block 30, and the slits 32, 33 are formed in the buttress 4. The positions of the ends of the respective slits 32, 33 in the radially inward direction of the tire are aligned straight in the tire circumferential direction. In the present embodiment, the positions of the ends of the slits 32, 33 in the radially inward direction of the tire serve as the edge of the straight region 70 in the radially outward direction of the tire. In areas between the slits 32, 33, the surface is formed flat from a position located toward the ground contact edge E1 from the ends of the slits 32, 33 in the radially inward direction of the tire.

In view of the situation that, in a buttress, a projection is typically formed at a part corresponding to a seam in a mold, and a side protector is formed for providing a design feature, it was found as a result of studies by the present inventors that the shape of the buttress greatly affects air resistance of the tire. In the buttress 4, by forming the straight region 70 having a flat surface without unevenness to extend at a predetermined length, and restricting the height of the projection 80 to a small size, it is possible to suppress generation of convection current and vortex at the tire side face and create an airflow along the tire side face, and air resistance of the tire can be effectively suppressed. In the following section, a suitable configuration of the straight region 70 and the projection 80 will be described in detail.

In the buttress 4, the length (d1+d2) in the tire radial direction from the edge of the straight region 70 in the radially outward direction of the tire to the tip 83 of the projection 80 is greater than the length (d3) in the tire radial direction from the ground contact edge E1 of the tread 10 to the edge of the straight region 70 in the radially outward direction of the tire (i.e., d1+d2>d3). Here, d1+d2>d3 is satisfied in a state where the pneumatic tire 1 is mounted on a normal rim and subjected to a load according to the definition of the ground contact edges E1, E2. Furthermore, the height (h) of the projection 80 is greater than or equal to 0.5 mm and less than or equal to 1.0 mm. When these conditions are satisfied, air resistance of the tire is specifically suppressed.

The straight region 70 and the projection 80 are formed along the tire circumferential direction in an annular shape with a uniform width. The straight region 70 and the projection 80 are formed continuously in the tire circumferential direction, and the above-noted length (d1+d2) in the tire radial direction denotes the sum of the widths of the straight region 70 and a first region 81 (described further below) of the projection 80. The above-noted length (d1+d2) in the tire radial direction is preferably greater than or equal to 103% and less than or equal to 130%, and more preferably greater than or equal to 105% and less than or equal to 120%, of the length (d3) in the tire radial direction. If these conditions are met, reduction in air resistance becomes more notable.

The surface of the straight region 70 is, for example, flat over the entire length, and includes no curved surface. However, within a range that does not impair the object of the present disclosure, such as within a range of less than 5% of the total area of the straight region 70, minor unevenness created by a design, a mark, or the like, may be present in the straight region 70. The angle of inclination (θ2) of the straight region 70 relative to the tire radial direction is preferably greater than or equal to 10° and less than or equal to 30°, and more preferably greater than or equal to 15° and less than or equal to 25°. The angle of inclination (θ2) means an angle formed on a radially inward side of the tire between a virtual line α along the tire radial direction and the surface of the straight region 70. When the angle of inclination (θ2) is within the above-noted range, reduction in air resistance is more notable.

The length (d2) of the straight region 70 in the tire radial direction is preferably greater than or equal to 5% and less than or equal to 15%, and more preferably greater than or equal to 7% and less than or equal to 10%, of the tire cross-sectional height. Here, the length of the buttress 4 in the tire radial direction is, for example, greater than or equal to 15% and less than or equal to 25% of the tire cross-sectional height. The tire cross-sectional height is, for example, greater than or equal to 160 mm and less than or equal to 180 mm. The length (d2) of the straight region 70 in the tire radial direction is preferably greater than or equal to 30% of the length of the buttress 4 in the tire radial direction. When the length (d2) in the tire radial direction satisfies these conditions, reduction in air resistance becomes more notable.

The projection 80 is a bump projecting outward in the tire axial direction from a profile plane β (see FIG. 5) of the buttress 4. The projection 80 is, for example, formed resulting from a seam in a mold, but its height (h) can be controlled by adjusting the shape of the mold. The profile plane β means a plane along the surface of the straight region 70 and the sidewall 2. The height (h) of the projection 80 means a length along a direction normal to the profile plane β and extending from the profile plane β to the tip 83, which is the highest part of the projection 80. While the height (h) is less than or equal to 1.0 mm and preferably less than or equal to 0.9 mm, if the height (h) is below 0.5 mm, an increase in air resistance may be caused.

The projection 80 is preferably formed along the tire circumferential direction on the circumference of a single circle. Further, the projection 80 preferably has a substantially uniform height over the entire length. In that case, the projection 80 has the shape of a perfect circle in the side view of the tire, and stable reduction in air resistance can be obtained. The width (i.e., the length in the tire radial direction) of the projection 80 is smaller than the length (d2) of the straight region 70 in the tire radial direction, and is, for example, greater than or equal to 3% and less than or equal to 8% of the tire cross-sectional height. The tip 83 of the projection 80 may be pointed as shown in FIG. 5, but may alternatively have a shape of a small curve such as that obtained when a corner is chamfered.

The projection 80 preferably includes a first region 81 which is formed flat from the edge of the straight region 70 in the radially inward direction of the tire toward the tip 83. The surface of the first region 81 is, for example, flat over the entire length, and includes no curved surface. The projection 80 further includes a second region 82 which is located in the radially inward direction of the tire from the tip 83 and which is curved so as to be convex in the inward direction of the tire. The radius of curvature (R) of the second region 82 is greater than or equal to 5 mm and less than or equal to 15 mm. When the first region 81 is flat and the second region 82 is a curved surface as described above, reduction in air resistance becomes more notable.

At the position of the boundary between the straight region 70 and the first region 81, the buttress 4 has a bend where the angle of inclination relative to the tire radial direction changes, but the surface of the buttress 4 is formed flat over the area extending from the ends of the slits 32, 33 in the radially inward direction of the tire to the tip 83 of the projection 80. With this feature, a smooth airflow along the tire side face can be easily created, and air resistance of the tire can be effectively suppressed. The angle of inclination of the first region 81 relative to the tire radial direction (or the virtual line α) is slightly greater than the angle of inclination (θ2) of the straight region 70, and is preferably greater than or equal to 15° and less than or equal to 35°.

The length (d1) of the first region 81 in the tire radial direction is preferably greater than or equal to 2% and less than or equal to 5% of the tire cross-sectional height, and is preferably greater than or equal to 10% of the length of the buttress 4 in the tire radial direction. If these conditions are met, reduction in air resistance becomes more notable. Further, the angle of inclination (θ1) of the first region 81 relative to the profile plane β of the buttress 4 is preferably greater than or equal to 5° and less than or equal to 10°, and more preferably greater than or equal to 6° and less than or equal to 8°.

In cases where the total width of the pneumatic tire 1 is greater than or equal to 205 mm and less than or equal to 275 mm, and the tire aspect ratio is greater than or equal to 60% and less than or equal to 80%, an example of a suitable range for the above-described length (d1) in the tire radial direction is greater than or equal to 3.0 mm and less than or equal to 8.0 mm. Furthermore, an example of a suitable range for the above-described length (d2) in the tire radial direction is greater than or equal to 10 mm and less than or equal to 20 mm .

Evaluation of Air Resistance

Regarding the pneumatic tire 1 (having a size of 245/70R17), air resistance was evaluated by a simulation that analyzes airflow around a rotating tire.

Concerning a test tire, drag (i.e., a force which acts on the tire placed in an airflow and which is in a direction parallel to and in the same orientation as the airflow) was measured, and a drag coefficient Cd was calculated using the formula below. Drag was determined based on a simulated pressure difference between the front and the rear of the tire. A smaller Cd value indicates less air resistance.

$$Cd=D/(\tfrac{1}{2}\rho U2S)$$

In the formula, D denotes drag that occurs. $\rho$ denotes air density, and was set to 1.18415 [kg/m$^3$]. U denotes characteristic velocity, which is a relative velocity between the tire and air, and was set to 36.1 [m/s]. S denotes characteristic area (i.e., a projected area of the front face) of the tire.

An Example tire was a tire having a configuration according to the above-described embodiment, and included buttresses in which straight regions and projections satisfying the conditions listed below were formed. As a result of evaluation using the above-described method, the Cd value was 0.512.

d1: 5.6 mm
d2: 15.4 mm
h: 0.8 mm
R: 9 mm
$\theta$1: 7°
$\theta$2: 22°
Tire cross-sectional height: 171.5 mm
Radius of curvature of curved surface between ground contact edge and straight region: 25 mm As a Comparative Example, evaluation was also performed for a tire in which a block with a height of 2 mm was provided at a position corresponding to the straight region of the Example tire, and in which the height of the projection was changed to 3.3 mm. As a result of evaluation using the above-described method, the Cd value of the Comparative Example tire was 0.536.

As such, according to the pneumatic tire 1 having the above-described configuration, air resistance can be effectively reduced. By configuring such that, in each buttress 4, the straight region 70 with a flat surface and the first region 81 of the projection 80 have a large length, an airflow along the tire side face can be created, and it is considered that air resistance can thereby be significantly reduced. In particular, reduction in air resistance is notable in cases where the aspect ratio of the pneumatic tire 1 is greater than or equal to 60%.

Design changes can be added as appropriate to the above-described embodiment so long as the object of the present disclosure is not impaired. For example, a pneumatic tire according to the present disclosure can be configured by combining the structure of the buttresses 4 with a tread pattern other than that of the above-described embodiment. The pneumatic tire 1 configured by combining the tread 10 and the buttresses 4 is one suitable form for improving aerodynamic performance.

REFERENCE SIGNS LIST 1 pneumatic tire; 2 sidewall; 3 bead; 4 buttress; 10 tread; 11 first main groove; 12 second main groove; 13 third main groove; 14 fourth main groove; 20 center block; 21, 22, 23 slit; 24, 25 sipe; 26 bridge; 30 first shoulder block; 31, 32, 33 slit; 34 sipe; 35 bridge; 40 second shoulder block; 41, 42, 43 slit; 44 sipe; 45 bridge; 50 first mediate block; 51, 52 slit; 53 bridge; 54, 55, 56 sipe; 60 second mediate block; 61, 62 slit; 63 bridge; 64, 65, 66 sipe; 70 straight region; 80 projection; 81 first region; 82 second region; 83 tip; CL equator; E1, E2 ground contact edge

The invention claimed is:

1. A pneumatic tire comprising a tread and a buttress, wherein in the buttress, there are formed:
   a straight region with a flat surface; and
   a projection which is located adjacent to the straight region in a radially inward direction of the tire and which is formed in an annular shape along a tire circumferential direction,
   a length (d1+d2) in a tire radial direction from an edge of the straight region in a radially outward direction of the tire to a tip of the projection is greater than a length (d3) in the tire radial direction from a ground contact edge of the tread to the edge of the straight region in the radially outward direction of the tire, and
   a height of the projection is greater than or equal to 0.5 mm and less than or equal to 1.0 mm;
   wherein the projection includes the tip, a first region which is formed flat from an edge of the straight region in the radially inward direction of the tire toward the tip, and a second region which is located in the radially inward direction of the tire from the tip and which is curved so as to be convex in an inward direction of the tire, the first region and the second region are coupled with each other at the tip.

2. The pneumatic tire according to claim 1, wherein a length (d2) of the straight region in the tire radial direction is greater than or equal to 5% and less than or equal to 15% of a tire cross-sectional height.

3. The pneumatic tire according to claim 1, wherein a length (d1) of the first region in the tire radial direction is greater than or equal to 2% and less than or equal to 5% of a tire cross-sectional height.

4. The pneumatic tire according to claim 3, wherein an angle of inclination ($\theta$1) of the first region of the projection relative to a profile plane of the buttress is greater than or equal to 5° and less than or equal to 10°.

5. The pneumatic tire according to claim 3, wherein a radius of curvature (R) of the second region is greater than or equal to 5 mm and less than or equal to 15 mm.

6. The pneumatic tire according to claim 1, wherein an angle of inclination ($\theta$2) of the straight region relative to the tire radial direction is greater than or equal to 10° and less than or equal to 30°.

7. The pneumatic tire according to claim 1, wherein a tire aspect ratio is greater than or equal to 60%.

8. The pneumatic tire according to claim 1, wherein the straight region and the projection are formed along the tire circumferential direction in an annular shape with a uniform width.

9. The pneumatic tire according to claim 1, wherein the projection is formed along the tire circumferential direction on a circumference of a single circle in an annular shape with a uniform width, and has a substantially uniform height over an entire length.

10. The pneumatic tire according to claim 1, wherein the tread comprises four main grooves extending in the tire circumferential direction and a plurality of blocks separated by the main grooves, and a plurality of sipes are formed in the respective blocks.

11. A pneumatic tire comprising a tread and a buttress, wherein in the buttress, there are formed:

a straight region with a flat surface; and a projection which is located adjacent to the straight region in a radially inward direction of the tire and which is formed in an annular shape along a tire circumferential direction, a length (d1+d2) in a tire radial direction from an edge of the straight region in a radially outward direction of the tire to a tip of the projection is greater than a length (d3) in the tire radial direction from a ground contact edge of the tread to the edge of the straight region in the radially outward direction of the tire, and a height of the projection is greater than or equal to 0.5 mm and less than or equal to 1.0 mm;

wherein the tread comprises a shoulder block, in the shoulder block, two types of slits extending beyond the ground contact edge into the buttress are alternately formed in the tire circumferential direction, and between the respective slits, the straight region is formed from a position located toward the ground contact edge from ends of the slits in the radially inward direction of the tire.

* * * * *